J. W. DIAMOND.
FISHING REEL.
APPLICATION FILED MAR. 20, 1909.

952,883.

Patented Mar. 22, 1910.

Witnesses
Clarence E. Day
Alice Townsend.

Inventor
Jay W. Diamond
By Parker V. Burton
Attorneys

UNITED STATES PATENT OFFICE.

JAY W. DIAMOND, OF LAKE ODESSA, MICHIGAN.

FISHING-REEL.

952,883.  Specification of Letters Patent. Patented Mar. 22, 1910.

Application filed March 20, 1909. Serial No. 484,644.

*To all whom it may concern:*

Be it known that I, JAY W. DIAMOND, a citizen of the United States, residing at Lake Odessa, county of Ionia, State of Michigan, have invented a certain new and useful Improvement in Fishing-Reels, and declare the following to be a full, clear, and exact description of the same, such as will enable others skilled in the art to which it pertains to make and use the same, reference being had to the accompanying drawings, which form a part of this specification.

This invention relates to fishing reels.

It has for its object an improved reel, in which the spool may be disconnected from the winding crank and allowed to run freely; and the winding crank may be quickly reconnected to the spool when it is desired to rewind the line thereon.

Figure 1:
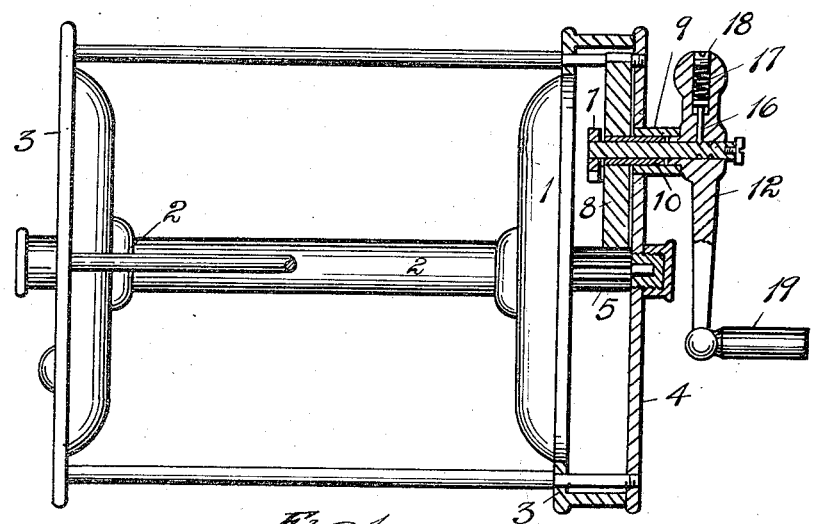
Figure 2:
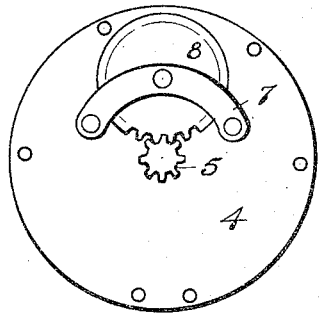
Figure 3:
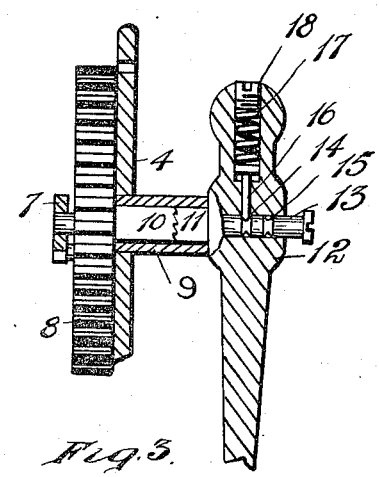

In the drawing:—Figure 1, is a side elevation, partly in section. Fig. 2, is an elevation of the connection between the gear of the winding wheel and the gear of the spool. Fig. 3, is a side elevation, partly in section, showing the crank connection on a larger scale.

The spool 1 runs on a spindle 2, journaled in a main frame 3. At the end of the spool is a housing 4, which forms an extension to the frame. Within the housing is a small pinion 5 secured to the spool, and as an extension of the tubular body thereof. Within the housing is also secured a supporting member 7 upon which the lower or inner end of the spindle 13 rests, which coacts with the outer member of the housing to form supports for the bearings of a gear wheel 8, the hub of which extends through a tubular extension 9 on the face of the housing. The end of the hub 10 is provided with crown serrations that engage with crown serrations on the hub 11 of a crank 12, which crank 12 with its hub engages over a spindle 13 that extends into and is secured to the supporting member 7 within the housing, forming a stud post for both the gear wheel 8 and the crank 12. In order that the parts may be held in engagement, to which position they are forced by pressure upon the top of the crank 12, the spindle 13 is provided with circumferential grooves 14 and 15, in either of which may engage the end of a spring pressed pin 16 that is housed in the end of the weighted crank 12, and is arranged to be pressed into its seat by a spring 17 held between a collar on the pin and a screw retainer 18 inserted in the weighted end of the crank. The crank is provided with a weighted end, which balances the handle 19. When the crank is so placed that the pin 16 may engage the groove 14, the crank and the driving wheel 8 are engaged; when the crank is shifted by upward pull upon the crank 12 to bring the pin 16 into engagement with the groove 15, the crank and driving wheel are disengaged. In the one case the spool will run free, and the crank remains at rest, and in the other case the actuation of the crank will wind the spool. In both positions of the crank 12 the spindle 13 whose lower end is fixedly held by the bearing 7, remains motionless.

What I claim is:—

1. In a fishing reel, in combination with a spool, a pinion member fixed to one end of the shaft thereof, an intermeshing gear wheel adapted to drive the same, a crank, a spindle correlating the gear wheel and the crank, by movement along which the crank may be thrown into and out of operative connection with the gear wheel, and means for yieldingly holding the same in either of such positions, substantially as described.

2. In a fishing reel, the combination of a spool the shaft thereof terminating in a pinion, a crank, a gear wheel adapted to be actuated thereby, and to in turn transmit actuation to the spool, and means whereby the crank may be thrown into and out of operative connection with said gear wheel by movement lengthwise of the axis thereof, substantially as described.

3. In a fishing reel, in combination with a frame, a spool rotatably supported therein a pinion carried at one end thereof, a spindle mounted therein adjacent to the pinion end of the spool, a gear wheel rotatably mounted thereon in intermeshing position with the adjacent end of the shaft of the spool, a hub for said wheel engaging about the spindle from one face of the gear wheel, the end of the hub being provided with crown serrations, and a crank having a hub member whose outer end is provided with similar crown serrations adapted to engage with those on the first named hub, said crank being adapted to be moved along said spindle to throw the serrated portions of the hubs into and out of operative connection with one another, substantially as described.

4. In a fishing reel, the combination of a frame, a spool rotatably mounted therein, a pinion member fixed to the shaft of the spool, a gear wheel, a fixed spindle whereon the gear wheel is rotatably mounted in intermeshing actuating position with respect to the pinion, and an actuating crank adapted to be moved lengthwise of said spindle into and out of engagement with the hub of the gear wheel, substantially as described.

In testimony whereof, I sign this specification in the presence of two witnesses.

JAY W. DIAMOND.

Witnesses:
F. L. MORES,
A. B. OSBORNE.